Dec. 3, 1968   J. A. PAYNE   3,414,334
DELAYING ACTION EQUALIZER VALVE
Original Filed March 24, 1964   2 Sheets-Sheet 1
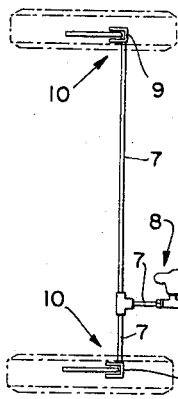
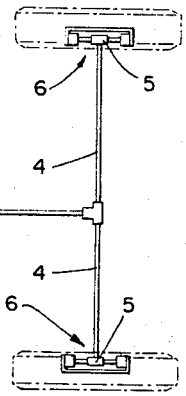
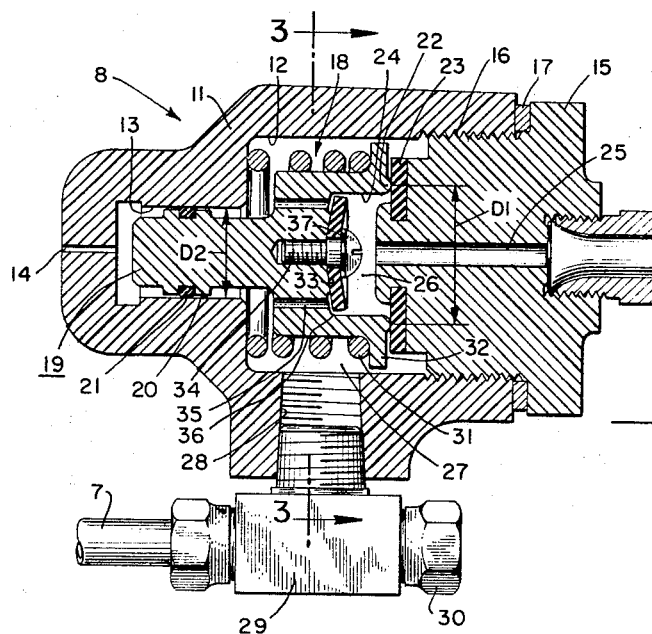
INVENTOR.
JAMES A. PAYNE
BY
John B. Sowell
ATTORNEY Dec. 3, 1968  J. A. PAYNE  3,414,334
DELAYING ACTION EQUALIZER VALVE
Original Filed March 24, 1964  2 Sheets-Sheet 2
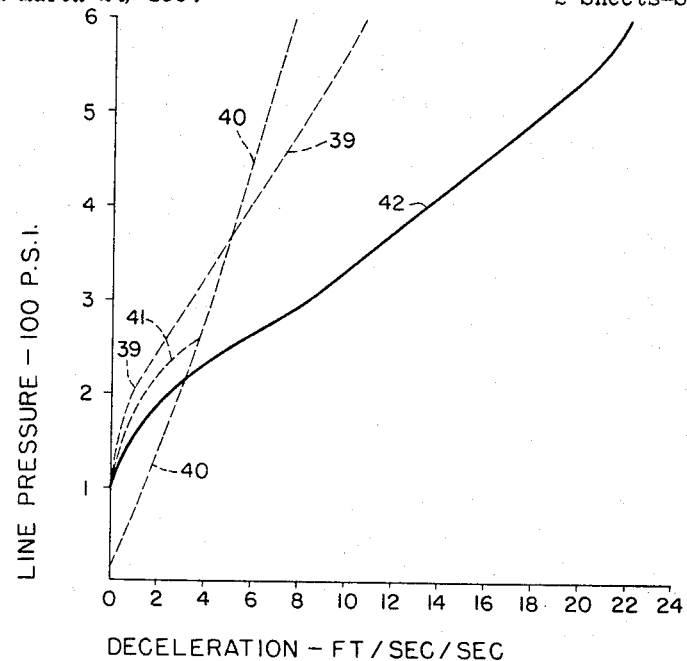
_Fig.5_
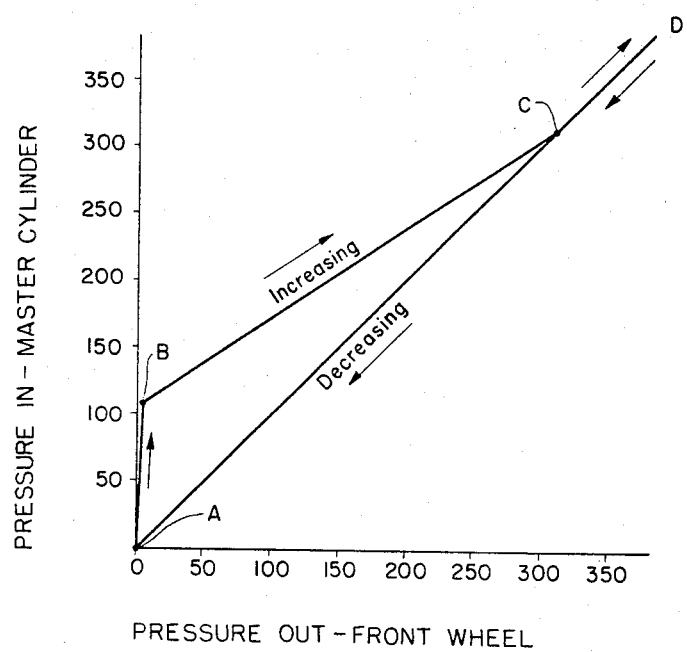
_Fig.6_
INVENTOR.
JAMES A. PAYNE
BY
John B. Sowell
ATTORNEY

# United States Patent Office 3,414,334
Patented Dec. 3, 1968

3,414,334
DELAYING ACTION EQUALIZER VALVE
James A. Payne, Warren, Mich., assignor to The
Budd Company, Philadelphia, Pa., a corporation
of Pennsylvania
Continuation of application Ser. No. 354,235, Mar. 24,
1964. This application Mar. 30, 1966, Ser. No. 540,144
9 Claims. (Cl. 303—6)

ABSTRACT OF THE DISCLOSURE

A hydraulic braking system having disk type brake and drum brake with a novel valve positioned in the hydraulic system for delaying the application of the disk brakes until a predetermined pressure has been applied to the drum brakes so that the disk and drum brakes will be actuated together. The novel valve operating sequentially as a relief valve, a pressure reducing valve and subsequently ceasing to affect the pressure of the hydraulic fluid supplied to the wheel brake cylinders.

This application is a continuation of application Ser. No. 354,235, filed Mar. 24, 1964, now abandoned.

The present invention relates to a hydraulic brake valve device and more particularly, to a delaying action equalizer valve for balancing the braking effect of disk brakes and drum brakes incorporated into a single braking system of an automobile.

Disk brakes have been employed on the front wheels of automobiles having drum brakes on the rear wheels. Theoretically, the rate of deceleration associated with both types of brakes is a linear function of the hydraulic line pressure at the wheel cylinders, and it would seem possible to design drum brakes and disk brakes having almost identical braking characteristics. However, drum type brakes usually employ heavy return springs which inhibit initiation of the drum type brake until the line pressure reaches approximately 100 lbs. p.s.i. The disk type brake becomes effective at line pressures much lower than 100 lbs. p.s.i. Furthermore, the rate of deceleration versus line pressure of a self-energizing drum type brake is not initially linear at low line pressures when the brakes are not fully self-energizing.

It is desirable from both the standpoint of wear and safety that the brakes on the front and rear wheels operate simultaneously with locking up.

Heretofore, some brake manufacturers have attempted to solve the problem of making disk brakes compatible with drum brakes in a single system by designing the two types of brakes to have similar characteristic curves, or alternatively, have provided separate line pressure systems for the two types of brakes. The prior art systems have not attempted to equalize the braking effect of one of the brakes to coincide with the braking effect of the other type of brake. At low line pressures, where the most wear occurs, braking on slick roadways is extremely critical if the brakes are not equalized.

Therefore, it is a primary object of the present invention to provide a simple and inexpensive delaying action equalizing valve for changing the low pressure braking characteristics of a disk type brake to have braking characteristics compatible with drum type brakes.

It is a general object of the present invention to provide a novel delaying action hydraulic valve for inhibiting the braking action of disk brakes until the line pressure of the brake system is sufficient to actuate the drum type brakes in the same braking system.

It is a further object of the present invention to provide a hydraulic valve that enables the operation of both disk brakes and drum brakes from the same hydraulic line of a single master cylinder.

It is another object of the present invention to provide a novel delaying action hydraulic valve that operates sequentially as a relief valve, a pressure reducing valve, and then ceases to reduce the pressure of hydraulic fluid.

In general, there is provided in a hydraulic braking system a valve body having a valve assembly slidably mounted therein, one end of the valve assembly cooperates with the valve body to form a valve and seat normally blocking the inlet to the valve body, the valve assembly is spring urged to close the valve and seat so that flow from the inlet to the outlet is inhibited until a predetermined pressure level is achieved in the inlet, partially opening the valve and seat and reducing the pressure of flowing fluid until a second predetermined pressure is reached in the inlet at which time the valve and seat are opened so as not to reduce the pressure of the fluid, and a piston is provided on the end of the valve assembly slidably mounted in a cylinder bore of the valve body, the cylinder bore is vented to the atmosphere so that the pressure on the piston normally urging the valve and seat to a closed position is at atmospheric pressure to enable the valve and seat to maintain a normally open position at or above the second predetermined pressure level without the requirement of fluid flow across the valve and seat.

Further objects and advantages will be apparent from the drawings and the following description.

FIG. 1 is a schematic view showing the delaying action equalizer valve in a preferred embodiment having drum type rear wheel brakes and disk type front wheel brakes actuated by a single master cylinder.

FIG. 2 is an enlarged section of the delaying action equalizer valve of FIG. 1.

FIG. 3 is a section taken through the valve body at lines 3—3 of FIG. 2.

FIG. 4 is an enlarged detail of the check valve portion of the valve assembly of FIG. 2.

FIG. 5 shows characteristic curves of the preferred embodiment of FIG. 1 which illustrates deceleration effect versus master cylinder line pressure.

FIG. 6 is a typical characteristic curve showing input pressures to and output pressures from the delaying action equalizer valve under normal braking conditions.

In the preferred embodiment a master cylinder 1 is energized by force on the brake pedal 2 causing an increase in pressure of the hydraulic fluid flowing in hydraulic line 3. Hydraulic fluid is conducted to hydraulic line 4 directly to the wheel cylinders 5 of the drum type rear brakes 6. Hydraulic fluid is conducted to hydraulic line 7 through the delaying action equalizer valve 8 and to the hydraulic pistons 9 of the disk type front brakes 10.

FIG. 2 shows a valve body 11 formed with a guide bore 12 and a cylinder bore 13 having a vent aperture 14 through the valve body. An end closure or cap 15 is affixed to the valve body 11 by means of threads 16 and brass washer 17. The valve body and cap provide a hollow fluid chamber 18 in which a valve assembly 19 is slidably mounted. One end of the valve assembly 19 is provided with a piston 20 having an O-ring seal 21 cooperating with the cylinder bore 13. The other end of the valve assembly 19 is provided with a raised ring or valve element 22 cooperating with a resilient washer or valve seat 23 mounted on the cap 15. A recessed chamber 24 in the valve assembly 19 is provided opposite the inlet port 25 in the cap 15. Hydraulic line 3 from the master cylinder 1 is connected to inlet port 25 by a typical flared tube fitting. Valve seat 23, cooperating with the raised ring face of valve 22, separates the fluid chamber 18 into an inlet chamber portion 26 and an outlet chamber portion 27. An outlet port 28 in the valve body 11 is connected to hydraulic line 7 through a tee connection 29 having a bleeder plug 30. Spring 31 acting in compression between valve body 11 and a flange 32 on valve assembly 19 normally urges valve face 22 into engagement with valve seat 23. A resilient disk 33 is mounted in recessed chamber 24 by screw means 34 so as to close ports 35, interconnecting inlet chamber portion 26 with outlet chamber portion 27, when the hydraulic fluid pressure is increased in inlet chamber portion 26. The valve seat 36 is shaped as a recessed annulus to provide a very small valve clearance between the seat 36 and the valve disk 33 cooperating to form a disk check valve. Screw means 34 may be provided with washers 37 of varying thickness to achieve a desired sensitivity of the disk check valve. The flange 32 of valve assembly 19 comprises a plurality of tabs 38 which permit the flange to slidably engage guide bore 12 without obstructing the flow of hydraulic fluid from the inlet port 25 to the outlet port 28.

Referring now to FIG. 5 which shows the characteristic curve 39 of the drum type rear brakes 6 and the characteristic curve 40 of the disk type front brakes 10. In the preferred embodiment described, the disk brakes were similar to those described and claimed in application, Ser. No. 248,004, entitled "Split Housing Disk Brakes" filed Dec. 28, 1962 by Edwin K. Buyze, et al. The drum type brakes were similar to the duo-servo self-energizing drum brakes shown and described in Patent 2,294,329. It will be noted that characteristic curve 40 shows that the disk type brake becomes effective at line pressure approximating 25 p.s.i., and the braking effect (deceleration) is approximately directly proportional to the increase in line pressure over the normal operating range. However, the characteristic curve 39 shows that the self-energizing type drum brake does not become effective until approximately 100 p.s.i. and the braking effect is a non-linear function of increasing line pressure until approximately 225 p.s.i. where the self-energizing action of the duo-servo brakes becomes fully effective. It is apparent from the examination of characteristic curves 39 and 40 that for identical hydraulic line pressures below approximately 350 p.s.i. the disk type brake would ordinarily supply the greater deceleration effect. Under light braking conditions this would cause excessive wear of the disk brakes, and on slippery roads, would tend to lock the front wheel brakes (disk brakes) before the rear wheel brakes (drum brakes) supply any braking effect. Such a condition would be extremely hazardous and induces excessive wear of the brake liners. When the equalizer valve 8 is inserted in series between the master cylinder 1 and the disk brakes 10 (front brakes only) the initial portion of the disk brake characteristic curve is modified as shown by a curve 41. Thus, it can be seen that the disk brakes are modified to become effective at the same pressure at which the drum type brakes become effective and the disk brake characteristic curve is further modified during the initial portion of the braking curve to practically equalize the braking effect between the drum type brakes and the disk type brakes. Further, the equalizer valve has no effect on the normal braking characteristic of the disk type brakes after the self-energizing feature of the drum type brakes has become fully effective. The combined effect of the modified disk brakes with the equalizer valve and the drum type brakes is shown by characteristic curve 42.

FIG. 6 shows a line pressure input versus line pressure output curve for typical operating conditions of the novel delaying action equalizer valve under light braking conditions. Under normal operating conditions of an automobile the brakes are OFF and only the residual pressure of the brake system is present in the master cylinder. The gage presure in the master cylinder 1 may be considered to be equal to the pressure in the inlet chamber portion 26 which is shown in FIG. 6 to be zero (point A). As the brake pedal 2 is lightly depressed, hydraulic fluid flows from the master cylinder 1 to the equalizer valve 8 and pressure builds up in the inlet chamber portion 26 to about 120 p.s.i. (point B). The initial increase in pressure closed the resilient disk 33 over the ports 35 and caused a small flow of fluid under the orifice of valve 22 and seat 23 but practically no pressure increase occurred in outlet chamber portion 27. A further increase in pressure in inlet chamber portion 26 causes an increase in pressure in outlet chamber portion 27; valve 22 has partially opened causing a pressure drop across the orifice of valve 22 and seat 23. The pressure regulating or pressure reducing operation of the valve continues until the pressure in the inlet chamber portion 26 reaches approximately 320 p.s.i. (point B to point C) at which time the pressure in the outlet chamber portion 27 is also 320 p.s.i. and the valve assembly 19 is displaced sufficiently to an open position where there is no longer a pressure drop across the orifice. Any further increase in pressure in the inlet chamber portion creates a similar pressure increase in the outlet chamber portion that follows the curve from point C toward point D and continues off the curve to the highest braking pressures. If the pressure in the master cylinder is released after passing point C on the curve the pressure in the inlet and outlet chamber portions remains the same and follows the portion of the curve between points D and A in returning to zero due to operation of the check valve 33–36 which permits return flow. Thus, during a normal continuous braking operation a pressure reduction takes place from the inlet to the outlet which is effective to modify the braking effect of the disk type brakes so that the characteristic curve 41 of the disk brakes is virtually equal to the characteristic curve 39 of the drum type brakes.

During very light braking the pressure in the master cylinder may be increased to point B (where both the front and rear brakes become operable) and further increased so that the pressure in the master cylinder is between points B and C. As long as the pressure differential between the inlet and the outlet is sufficient to keep the check valve closed the pressure differential is maintained, for the orifice 22–23 as well as the check valve 33–36 is closed when there is no fluid flow. Thus, it is seen that for very light braking loads anywhere along the curve between points B and C, the front and rear brakes, are operating on curves 41 and 39 respectively.

If the pressure in the master cylinder is held static or substantially the same after reaching a point on the curve between points B and C the pressure differential between the inlet and outlet is maintained. However, if the brakes are released while operating on this portion of the curve, the pressure in the inlet and the outlet chamber portions immediately equalizes and returns to zero along the curve between points D and A due to the operation of fluid flow through the check valve 33–36. Thus, it is seen that during any increase in fluid pressure in the master cylinder the outlet pressure is determined by points on curve ABCD, and that during any decrease or release in pressure in the master cylinder the pressure in the outlet is determined by points on curve DA where the inlet and outlet pressures are equal.

It will be noted, with reference to FIG. 2 that the diameter of the raised ring valve 22 (shown as diameter D1) and the diameter of the cylinder bore 13 (shown as diameter D2) are subject to different pressures. When the pressure in inlet chamber portion 26 is equal to the pressure in outlet chamber portion 27, the effective area being acted upon by this pressure to move the valve assembly 19 to the open position is $\pi/4 \times D1^2$, and the effective area acting to move the valve assembly 19 to the closed position is $\pi/4 \times (D1-D2)^2$. Thus, the force acting to open the valve can be equated to the difference in areas times the pressure in the fluid chamber (i.e., $\pi/4 \times D2^2$) for the piston 20 is vented to the atmosphere at zero gage pressure.

The point B on the curve of FIG. 6 may effectively be moved lower by increasing the diameter of the raised ring 22 (diameter D1), or making spring 31 lighter. The point C on the curve of FIG. 6 may be raised by decreasing the diameter of cylinder bore 13 or by increasing the strength of the spring 31. Changing the strength of the spring moves the curve up or down. Changing the area of the valve assembly changes the slope of the curve. Thus, it can be seen that points B and C on the curve of FIG. 6 may be raised and lowered so as to modify the characteristic curve 40 of the disk brake so that the modified curve is virtually identical with the characteristic curve 39 of the drum type brakes.

Having explained the operation of the preferred embodiment it is now apparent that the novel equalizer valve can be easily adjusted to come into play at a pressure level selected to bring the rear brakes into operation simultaneously with the operation of the front wheel brakes. While the equalizing valve has been explained with regard to a compatible system embodying disk brakes and drum brakes, the novel valve may be employed to modify other incompatible brake systems. For example, the equalizer valve may be employed on trucks with trailers where the braking characteristic differs radically between fully loaded and unloaded conditions. Such an adaption could be made by those skilled in the art by employing a solenoid valve bypass around the equalizing valve, selectively energized by an electrical switch in the cab in series with a switch actuated by movement of the brake pedal.

It is apparent from the explanation that the equalizer valve operates in a desirable manner to achieve smooth operation and is void of flutter that would occur in valves known in the prior art.

Modifications other than those mentioned above will be apparent to those skilled in the art which is only limited by the appended claims.

I claim:

1. A device for regulating the pressure of hydraulic fluid being supplied from a master cylinder to the wheel cylinders of an automobile comprising: a hollow valve body having a cylindrical hydraulic fluid chamber, a piston bore of lesser diameter than said hydraulic fluid chamber, a vent through said body connecting said piston bore to the atmosphere, said valve body having an outlet aperture adapted to connect said fluid chamber to said wheel cylinders; an end cap forming a wall of said hydraulic fluid chamber, an inlet aperture through said cap adapted to connect said fluid chamber to said master cylinder, a valve seat on the fluid chamber wall of said cap surrounding said inlet aperture and of smaller diameter than said fluid chamber, a valve assembly slidably mounted in said cylindrical hydraulic fluid chamber and adapted to divide said chamber into an inlet chamber portion and an outlet chamber portion, a piston on said valve assembly slidably fitted in said piston bore and forming a hydraulic seal in said bore, a recessed valve chamber in said valve assembly opposite said inlet aperture, port means in said valve assembly interconnecting said inlet chamber portion with said outlet chamber portion, a resilient disk mounted on said valve assembly in said recessed valve chamber juxtaposed said port means and cooperating therewith during periods of low hydraulic pressure conditions in said recessed chamber to initially check hydraulic fluid flow from said inlet chamber portion into said outlet chamber portion, an annular raised valve face on said valve assembly juxtaposed said valve seat on said cap, spring means in said hydraulic fluid chamber biasing said annular valve face on said valve assembly into engagement with said valve seat on said cap, increased pressure from said master cylinder being operable whereby said valve face is raised from said valve seat by hydraulic fluid flow from said inlet chamber portion to said outlet chamber portion providing in conjunction with said spring means pressure regulation of said hydraulic fluid, said valve face being further raised and held in an open position relative to said valve seat by a subsequent predetermined increase in static hydraulic fluid pressure from said master cylinder predetermined by said spring means whereby said device operates sequentially as a relief valve, a pressure reducing valve and subsequently ceases to reduce pressure of hydraulic fluid supplied to all the wheel cylinders of an automobile.

2. A regulating valve as set forth in claim 1 wherein said valve seat comprises a flat annular resilient washer mounted on said cap cooperable with a rounded annular ring on said valve assembly.

3. A regulating device as set forth in claim 1 wherein there is further provided a radial flange on said valve assembly having a plurality of guide tabs slidably engageable with said cylindrical, hydraulic fluid chamber of said valve body.

4. A regulating device as set forth in claim 1 wherein said recessed valve chamber in said valve assembly further includes a recessed annulus shaped valve seat providing a normally open check valve cooperable with said resilient disk.

5. In combination in a hydraulic braking system having a disk type brake, a drum type brake, and individual fluid motors for actuating each of said brakes, said drum brake requiring greater fluid pressure for said drum brake fluid motor for initial actuation thereof than said disk brake fluid motor requires for initial actuation of said disk brake; a manually actuated means operably connected to said fluid motors for supplying fluid under pressure for energizing said fluid motors, and a valve means positioned between said fluid pressure supplying means and said disk brake fluid motor for delaying application of fluid presure to said disk brake fluid motor until a predetermined pressure has been attained by said fluid pressure supplying means for actuating said disk brake and said drum brake simultaneously.

6. The braking system as claimed in claim 5 wherein said valve means includes pressure sensitive means for blocking flow of fluid under pressure to said disk brake fluid motor until a predetermined pressure has been attained by said fluid pressure supplying means, and check valve means for maintaining fluid pressure on the fluid pressure supplying means side of greater than the fluid pressure on the disk brake fluid motor side of said valve means.

7. The braking system as claimed in claim 5 wherein said manually actuated fluid pressure supplying means includes a manually actuated lever operably connected to a piston, said piston being movable thereby within a cylinder for exerting pressure on the fluid in said hydraulic braking system, whereby such fluid under pressure is supplied to the brake system for actuation thereof.

8. A metering valve for hydraulic brake systems comprising a body portion having an inlet to receive hydraulic pressure and an outlet to transmit a modified hydraulic pressure to a wheel cylinder, passage means normally connecting said inlet to said outlet, a valve adapted to close said passage, spring means engaging said valve to urge said valve into a closed position against any hydraulic pressure entering said inlet to produce a predetermined hydraulic pressure drop between said inlet and said outlet, hydraulic pressure responsive means responsive to the hydraulic pressure in said passage to oppose said spring means to cause said pressure drop to be gradually reduced and to open said valve after a predetermined pressure is reached, and a normally open check valve arranged to permit return flow of fluid from said outlet to said inlet and to close in response to fluid flow from said inlet to said outlet.

9. In a hydraulic brake, a system comprising a master cylinder, front and rear wheel brake cylinders, and means hydraulically connecting said master cylinder to said wheel cylinders, that improvement which comprises a metering valve device in the hydraulic connection between said master cylinder and said front wheel cylinders for initially maintaining a differential pressure in said front and rear wheel cylinders and subsequently merging said pressures into a uniform pressure, said device comprising a housing having passage means providing a connection between said master cylinder and front wheel cylinders, differential area piston means, means carried by said piston means for closing said passage means, yieldable means biasing said piston means in a direction tending to keep said valve means closed, said piston means having a first portion provided with a given effective area exposed to master cylinder fluid pressure acting in a direction opposing said yieldable means and a second portion provided with a reduced effective area exposed to front wheel cylinder pressure acting in a direction assisting said yieldable means, whereby the net effect of the fluid pressures acting on said piston means will gradually neutralize the force of said spring and ultimately maintain said passage means in an open condition as master cylinder pressure is increased.

References Cited
UNITED STATES PATENTS 2,916,884 12/1959 Bricker et al.
3,055,390 9/1962 Scheldorf.
3,152,606 10/1964 Vedder et al.

MILTON BUCHLER, *Primary Examiner.*

JOHN J. McLAUGHLIN, *Assistant Examiner.*